(12) United States Patent
Grue

(10) Patent No.: US 9,832,264 B2
(45) Date of Patent: *Nov. 28, 2017

(54) DIRECTING TO SHARED CONTENT

(71) Applicant: Dropbox, Inc., San Francisco, CA (US)

(72) Inventor: Anthony Grue, San Francisco, CA (US)

(73) Assignee: DROPBOX, INC., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/258,452

(22) Filed: Sep. 7, 2016

(65) Prior Publication Data

US 2017/0085642 A1  Mar. 23, 2017

Related U.S. Application Data

(63) Continuation of application No. 14/170,243, filed on Jan. 31, 2014, now Pat. No. 9,461,949.

(51) Int. Cl.
| | |
|---|---|
| G06F 15/16 | (2006.01) |
| H04L 29/08 | (2006.01) |
| H04L 12/58 | (2006.01) |
| G06F 17/30 | (2006.01) |
| H04L 29/06 | (2006.01) |
| H04L 12/18 | (2006.01) |

(52) U.S. Cl.
CPC .... H04L 67/1095 (2013.01); G06F 17/30575 (2013.01); H04L 12/1827 (2013.01); H04L 51/08 (2013.01); H04L 65/403 (2013.01); H04L 65/4015 (2013.01); H04L 67/02 (2013.01)

(58) Field of Classification Search
CPC .. H04L 51/08; H04L 65/403; G06F 17/30575
USPC .......................................... 709/204–207, 248
See application file for complete search history.

(56) References Cited

U.S. PATENT DOCUMENTS

| | | | |
|---|---|---|---|
| 9,461,949 B2* | 10/2016 | Grue | ............... H04L 51/08 |
| 2005/0091316 A1 | 4/2005 | Ponce et al. | |
| 2009/0313304 A1 | 12/2009 | Goodger et al. | |
| 2013/0066975 A1 | 3/2013 | Kantor et al. | |
| 2014/0136528 A1 | 5/2014 | Anima et al. | |

* cited by examiner

Primary Examiner — Bharat N Barot
(74) Attorney, Agent, or Firm — Polsinelli PC

(57) ABSTRACT

A sharer account of a content management system may share a link to a non-synchronized (i.e., read-only) version of a content item, with a recipient that already has access to a synchronized (i.e., read-write) version of the content item. This can possibly be due to the sharer forgetting that the recipient already has access to the synchronized version, the sharer finding it more convenient to share the link, and/or due to various other reasons. The present disclosure can determine that the recipient, with whom the link is shared, already has access to the synchronized version of the shared content item. The recipient can be notified that he already has access to the synchronized version and can be provided with an option to access the synchronized version (which can be stored locally at the recipient's device and/or stored online at the recipient's account with the content management system).

20 Claims, 12 Drawing Sheets

DIRECTING TO SHARED CONTENT

CROSS-REFERENCE TO RELATED APPLICATIONS

This application is a continuation of U.S. patent application Ser. No. 14/170,243, filed on Jan. 31, 2014, entitled, "MANAGING LINKS AND INVITATIONS TO SHARED CONTENT"; which is hereby expressly incorporated herein by reference in its entirety.

TECHNICAL FIELD

The present technology pertains to shared content, and more specifically pertains to directing a user to a shared content item.

BACKGROUND

Online content storage is becoming more popular. People frequently store, access, or otherwise interact with content stored at online content management systems. Documents, pictures, music, videos, directories, folders, and other types of content items can be stored at online content management systems to be accessed by users of the online content management systems. In some cases, a content item can be shared by one user with another user(s) via an online content management system.

In one example, a first entity can store a collection(s) of content items at the first entity's account with an online content management system. In other words, the first entity can be the "owner" of the collection(s) of content items. In some embodiments, a collection of content items can include (but is not limited to) a file, a directory, a document within a directory, a photo album, a media playlist, data, etc. In this example, the first entity (i.e., owner) can decide to share a content item with one or more other entities (also known as "recipients") via the online content management system. As such, the first entity can also be known as a "sharer" of the content item. The recipients can choose whether or not to accept the sharing of the content item.

In some cases, if the recipients accept the sharing of the content item, then the recipients can download the content item via the online content management system and the content item can be synchronized among the sharer (e.g., owner) and recipient accounts (also collectively known as "member accounts" of the shared content item). As such, if any one of the sharer and/or the recipients (i.e., "members") modifies the shared, synchronized content item, then the modification(s) made to the shared, synchronized content item will be updated (i.e., synchronized, reflected, applied, effected, etc.) at each of the sharer account and/or the recipient accounts.

In some instances, a sharer account can share a content item to one or more recipient accounts. Once a recipient account accepts the share invitation, the recipient account becomes a member for the shared content. Accepting the share invitation also causes the shared content item to be synchronized among the sharer and recipient accounts. In other words, the share of the synchronized content item can correspond to a read-write share, which can allow the sharer account as well as the recipient accounts to read, write, edit, update, modify, etc., the content item. The edits, updates, modifications, etc., can be synchronized (e.g., take place, be updated, be reflected, etc.) with respect to the sharer account and the recipient accounts.

Nevertheless, for various reasons, a first member account (such as the sharer account) may subsequently share a non-synchronized (i.e., unsynchronized) version of the content item to the other member accounts (which can be performed via a shared link). In some cases, a non-synchronized (i.e., unsynchronized) version of the content item can refer to a version of the content item that is read-only with respect to one or more recipients. In other words, if the sharer shares a non-synchronized version of the content item, any modifications a recipient makes to the non-synchronized version will not get synchronized (e.g., take place, be updated, be reflected, etc.) with respect to the original content item that was shared by the sharer. Instead, a modification, edit, update, etc., to the non-synchronized version of the content item made by a recipient can be saved locally or to the recipient's account with the online content management system, but the modification, edit, update, etc., will not take place, be reflected, etc., with respect to the other users associated with the share of the non-synchronized version. It follows that a sharing of the non-synchronized version (i.e., non-synchronized share) of the content item can also be referred to as a sharing of the read-only version of the content item (i.e., read-only share).

In one example, a first member account may have forgotten that a synchronized version of a content item has already been shared with the other member accounts. In another example, it may have been more convenient for the first member account to share the non-synchronized (i.e., unsynchronized, read-only) version of the content item to the other member accounts. In a further example, the first member account may have wanted to use the sharing of the non-synchronized version as a reminder, notification, or information provider to the other member accounts.

However, a share invitation (e.g., link share invitation) to the other member accounts regarding the non-synchronized version of the content item may cause inconvenience or other concerns to the other member accounts, since the synchronized version of the content item has already been shared with them. For example, the other members can end up downloading multiple copies or versions of the content item. In another example, the other members can make edits to the non-synchronized version, but the edits cannot be updated or synchronized (e.g., with respect to the original sharer and/or the other members). In a further example, the other members may have to recognize that they already have access to the synchronized version and thus may need to manually navigate to the location at which the synchronized version is stored. These and other concerns can create challenges for the overall user experience associated with sharing content via online content management systems.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for directing a user account to shared content. In some embodiments, a user of the online content management system can store data, such as collections of content items (e.g., directories, files, albums, playlists, etc.), at the online content management system. The user can be considered the "owner" of the collections of content items. The owner can share one or more of his content items with one or more other users, such that the shared content items can be synchronized among the owner and the other users with whom the content items are shared. In this case, it follows that the owner can also be known as the "sharer" and the one or more other users can also be known as the "recipients." The sharer and the recipients can also be collectively known as "members" of the shared content items.

In one example, a content item associated with a content management system account of a sharer can be shared with a content management system account of a recipient, such that the content item is synchronized at the sharer's account and at the recipient's account (i.e., at all accounts of members of the shared and synchronized content item). In other words, the member accounts can have access to a synchronized version of the shared content item. Accordingly, if one member account makes a modification to the synchronized version of the shared content item, then the modification will be applied (e.g., updated, reflected, implemented, etc.) to the synchronized version of the content item at each of the other member accounts.

Continuing with the example, in some cases, a sharer may share a link to a non-synchronized (i.e., unsynchronized, read-only) version of the content item to some recipient accounts that already have access to the synchronized version (i.e., to some member accounts). This can be due to the sharer forgetting that the recipients are already members of the shared content item, the sharer finding it convenient to share the link, and/or due to various other reasons. Accordingly, various embodiments of the present disclosure can detect that a recipient, with whom the link is shared, is already a member of the shared content item. Thus, the recipient can be notified that he already has access to the synchronized version of the content item. Moreover, in some embodiments, an option to access the synchronized version (which can be stored locally at the recipient's device and/or stored online at the recipient's account with the content management system) can be provided to the recipient.

In some embodiments, the content management system can process the shared link and obtain information about the content item accessible via the link. The obtained information about the content item can include identities of member accounts (if any) that already have been granted access to the content item. The content management system can determine whether the recipient of the link share invitation is already a member of the content item (i.e., whether a synchronized version of the content item has already been shared with the recipient). If so, then the content management system can notify the recipient that he already has access to the (synchronized version of the) content item. Also, in some instances, the system can provide the recipient with an option to navigate to, or otherwise access, the (synchronized version of the) content item.

It is important to note that the various embodiments and/or examples discussed herein are for illustrative purposes only. A person having ordinary skill in the art would recognize various other manners or approaches that can be utilized consistent with the scope of the present disclosure. Various other functions and advantages are described and suggested below as may be provided in accordance with the various embodiments.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for processing shared content. In some embodiments, a sharer account of a content management system may share a link to a non-synchronized (i.e., unsynchronized, read-only) version of a content item, with a recipient account that already has access to a synchronized version of the content item. This can possibly be due to the sharer forgetting that the recipient account already has access to the synchronized version, the sharer finding it more convenient to share the link, and/or due to various other reasons. The present disclosure can determine that the recipient, with whom the link is shared, already has access to the synchronized version of the shared content item. The recipient can be notified that he already has access to the synchronized version and can be provided with an option to access the synchronized version (which can be stored locally at the recipient's device and/or stored online at the recipient's account with the content management system).

Figure 1:
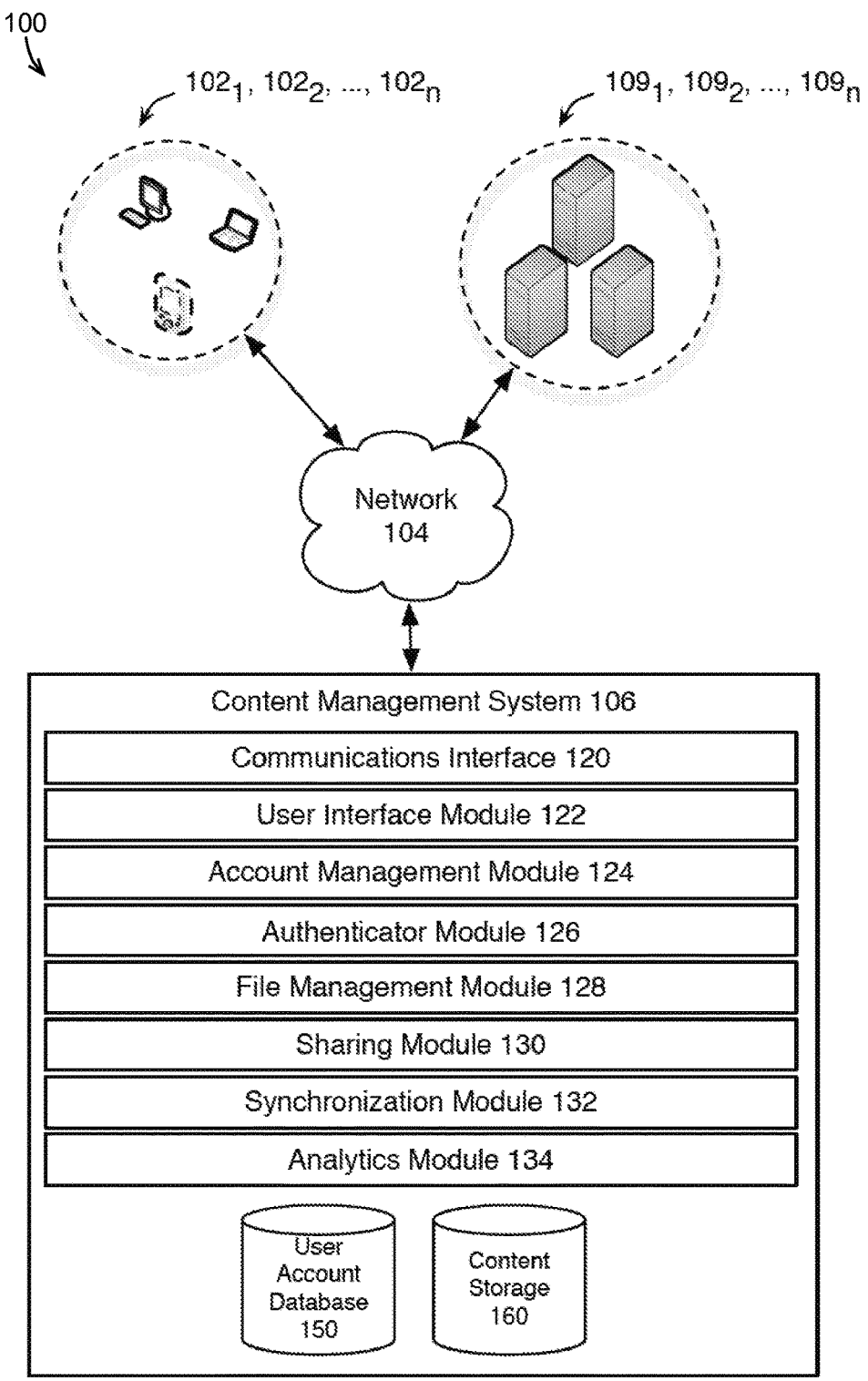
FIG. 1 shows an exemplary configuration of devices and a network in accordance with the invention.

With respect to implementing various embodiments of the disclosed technology, an exemplary system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, ..., $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device 102.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include folders or other mechanisms of grouping content items together with different behaviors, such as collections, playlists, albums, etc. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, HFS, HFS+, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device 102$_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device 102$_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers 109$_1$, 109$_2$, ..., 109$_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be sent to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible.

Figure 2:
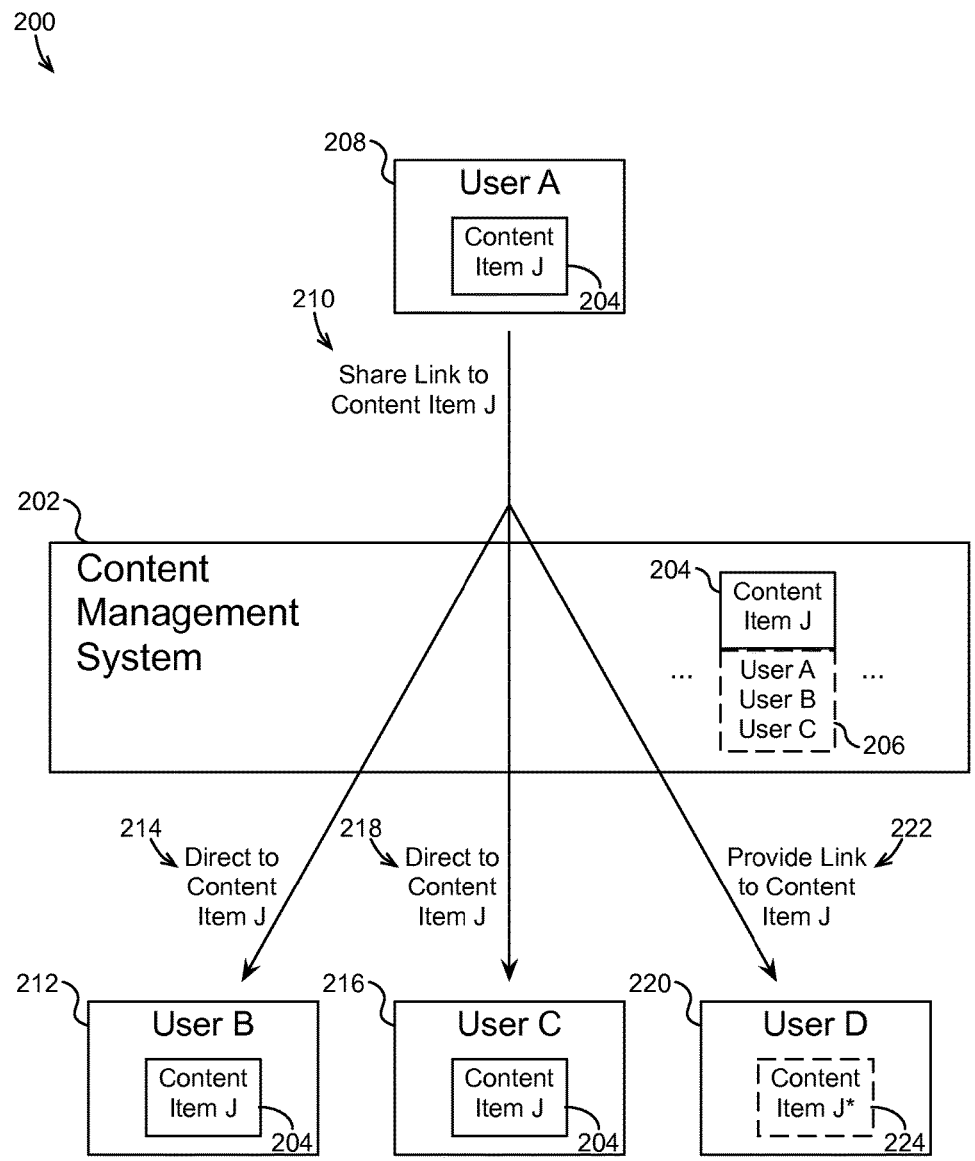
FIG. 2 shows an exemplary system embodiment for directing to shared content.

With reference now to FIG. 2, FIG. 2 shows an exemplary system embodiment for directing to shared content. Exemplary system embodiment 200 can include a content management system 202 (e.g., content management system 106 in FIG. 1). Content management system 202 can be utilized to store data representing a content item, such as content item J 204. Content item J 204 can be, for example, a file, a directory, an album, a playlist, and/or other data.

In some cases, content item J 204 can be a shared content item. Additional information 206 related to content item J 204, such as metadata about the sharing of content item J 204, can be stored at content management system 202. Information 206 can indicate one or more member accounts that have access (e.g., read-write access) to a shared, synchronized version of content item J 204. In one example, additional information 206 can indicate that the one or more member accounts can include User A 208, User B 212, and User C 216, as shown in FIG. 2.

In the example, User A 208 can be the "owner" of content item J 204. User A 208 can have created content item J 204, stored content item J 204 locally at User A's computing device(s), and uploaded content item J 204 to User A's account at content management system 202. Moreover, in this example, User A 208 can be a sharer of content item J 204. Read-write access to content item J 204 can be shared by User A 208 to User B 212 and User C 216 via content management system 202, such that content item J 204 can be synchronized among the content management system accounts of User A 208, User B 212, and User C 216 (i.e., the member accounts). Further, a synchronized version of content item J 204 can be stored locally at User A's computing device(s), User B's computing device(s), and User C's computing device(s). A modification made to the synchronized version of content item J 204 by one of the member accounts can be updated (i.e., applied, implemented, reflected, etc.) at each of the other member accounts and member account devices.

As shown in FIG. 2, User A 208 can share 210 a non-synchronized (i.e., unsynchronized, read-only) version of content item J 204, for example, via a link. User A 208 can utilize content management system 202 to obtain a link (e.g., URL address, QR code, etc.) to the non-synchronized version of content item J 204 and provide the link to one or more recipient accounts (e.g., User B 212, User C 216, and User D 220). In some cases, at least some of the recipient accounts can be member accounts that already have access to the synchronized version of content item J 204. This can be due to the sharer forgetting that he previously shared the synchronized version of the content item to the member accounts already, the sharer finding it convenient to share the link, and/or various other reasons. However, receiving a share invitation to the non-synchronized version of shared content can cause confusion, inconvenience, or other concerns for a member account that already has access to the synchronized version of the shared content.

Continuing the example of FIG. 2, content management system 202 can make a determination that at least some of the recipient accounts (User B 212 and User C 216) of the shared link already have access to the synchronized version of content item J 204, whereas User D 220 does not have access to the synchronized version of content item J 204. In some embodiments, content management system 202 can analyze information 206 relating to shared content item J 204. Information 206 can be used to identify one or more member accounts (e.g., User A, User B, User C) of shared content item J 204. The member accounts can already have access to the shared, synchronized version of content item J 204.

Accordingly, content management system 202 can direct 214 User B 212 to a location associated with User B 212 at which the synchronized version of content item J 204 is stored, and can direct 218 User C 216 to a location associated with User C 216 at which the synchronized version of content item J 204 is stored. In one example, if User B 212 is running an application (i.e., client application) operable with content management system 202, then the application can communicate with the operating system of User B's computing device to direct User B 212 to a local directory on his computing device where the synchronized version of content item J 204 is stored. In another example, if User C 216 is using a browsing application to access a web interface of content management system 202, then the web interface can direct User C 216 to an online directory at User C's content management system account where the synchronized version of content item J 204 is stored.

In contrast, content management system 202 can enable the link to be provided 222 to User D 220, since User D 220 is not associated with a member account (i.e., does not have access to the synchronized version of content item J 204). User D 220 can thus access (e.g., download) the non-synchronized version (i.e., "content item J*") 224 of content item J. If a member account (e.g., User A, User B, User C) of shared, synchronized content item J 204 makes a modification to the shared, synchronized version of content item J 204, then the modification will be applied to content item J 204 at the other member accounts, but the modification will not be applied to User D's non-synchronized version 224 of content item J. Similarly, if User D 220 makes a modification to his non-synchronized version 224 of content item J 204, the modification will not be applied to the member accounts' synchronized version of content item J 204.

Figure 3A:
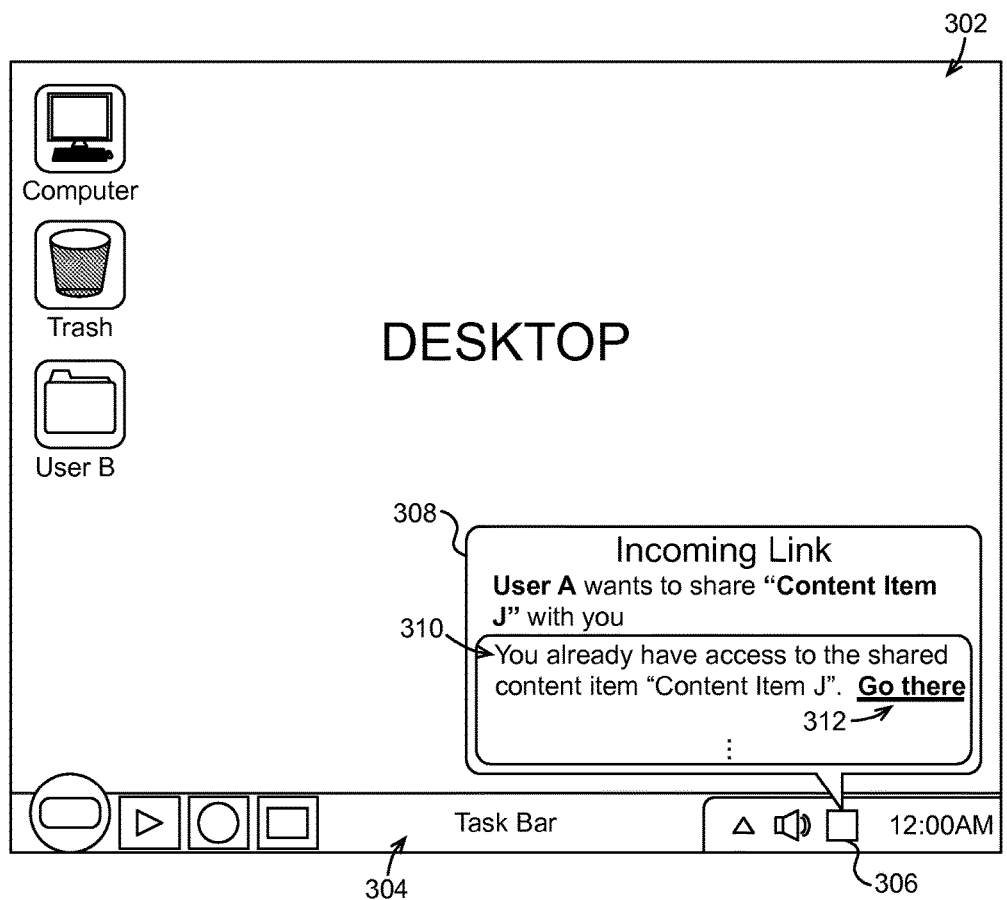
FIG. 3A shows an exemplary client application for directing a user account to shared content.

Turning now to FIG. 3A, an exemplary client application for directing a user account to shared content is shown. In the example of FIG. 3A, there can be one or more interfaces, such as desktop 302 and/or task bar 304 provided by an operating system of a computing device. In this example, the computing device, such as a desktop or notebook computer, can be associated with a user, such as User B. The computing device can be running an application operable and/or compatible with a content management system (e.g., 106 in FIG. 1). In FIG. 3A, the application can be represented by icon 306 displayed in task bar 304. In some embodiments, the application (i.e., client application, desktop application, etc.) can be configured to work in conjunction with the content management system to synchronize User B's data stored locally at the computing device with data stored at User B's account at the content management system. As such, User B's local collections of content items can be synchronized with those at his account at the content management system, and vice versa.

In the example of FIG. 3A, User A can invite User B to a shared content item (e.g., "Content Item J"). In this example, User A can initiate a share invitation via the content management system. The share invitation can include an electronic reference, such as a link (e.g., URL address, QR code, etc.), that provides access to a non-synchronized (i.e., unsynchronized, read-only) version of the shared content item. Subsequent to User A's initiation of the share invitation, the content management system can send a communication to User B via the client application running on the computing device of User B. Based on the communication, the client application can present notification 308 (or another suitable indicator) to User B. For example, notification 308 can include a message specifying that User A has shared a link to access Content Item J with User B.

However, the shared link is configured to provide access to the non-synchronized version of the content item, even though User B may already have access to the synchronized version of the content item. In this example, User A can have previously shared the synchronized version of Content Item J with User B, such that User B is already a member of shared, synchronized Content Item J. Yet when User B receives and accesses the link shared by User A, User B will be directed to the non-synchronized version of Content Item J. In some cases, User B can download the non-synchronized version of Content Item J while also having the synchronized version. This can cause confusion, inconvenience, and/or other concerns.

Various embodiments of the present disclosure can enable the content management system to detect that User B already has access to the synchronized version of Content Item J. In some embodiments, the content management system can detect that User B already has access based on obtaining data (e.g., metadata) about shared Content Item J. The data can indicate identifications of one or more user accounts that are members of shared Content Item J. In some embodiments, the identifications of the one or more user accounts can correspond to namespace data of the one or more user accounts. In this example, User A can be the owner of Content Item J and can have already shared Content Item J with User B, such that the member accounts can include the accounts associated with User A and User B.

Having determined that User B already has access to the synchronized version of Content Item J, the client application for the content management system can notify 310 User B that he already has access to the synchronized version of Content Item J. Moreover, in some embodiments, the client application can direct User B to a location at which the synchronized version of Content Item J is stored. In the example of FIG. 3A, the client application can provide option 312 to open a file browsing application and navigate to a location on User B's computing device where the synchronized version of Content Item J is stored.

Figure 3B:
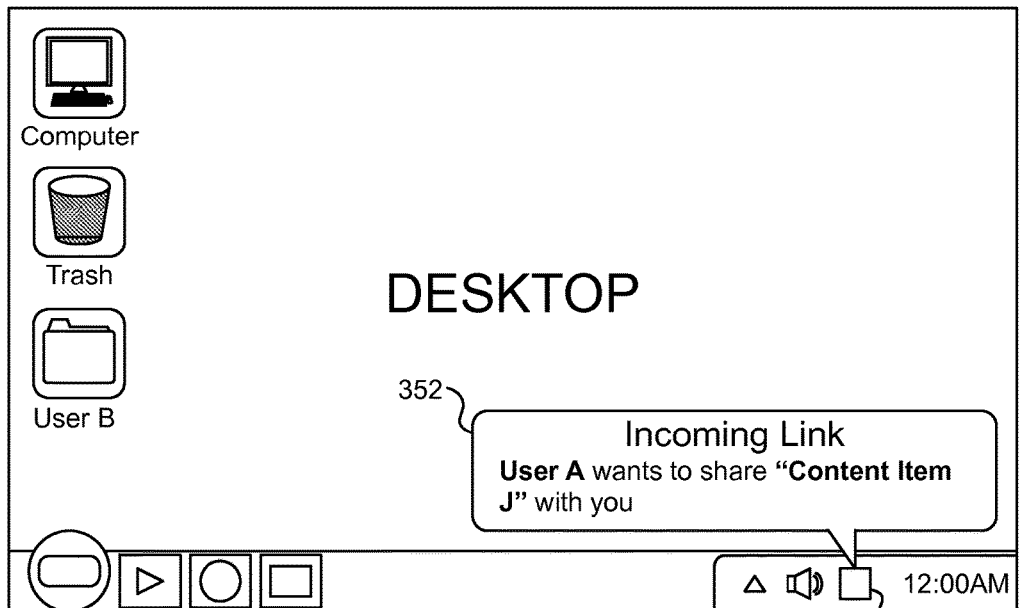
FIG. 3B shows an exemplary client application for directing a user account to shared content.
Figure 3C:
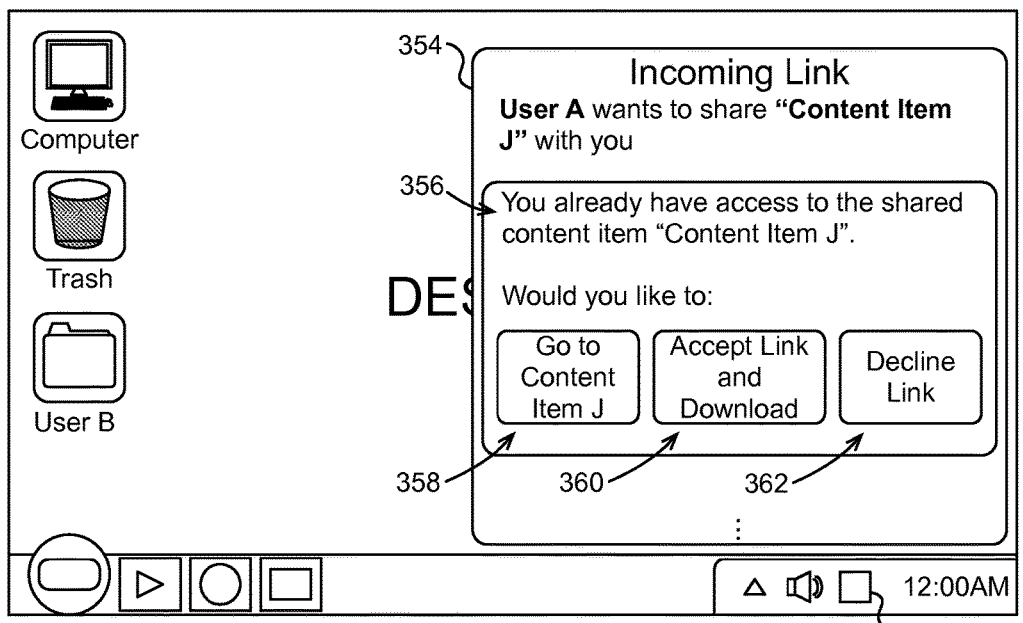
FIG. 3C shows an exemplary client application for directing a user account to shared content.

FIG. 3B and FIG. 3C show an exemplary client application for directing a user account to shared content. In FIG. 3B and FIG. 3C, a computing device can be running an application, represented in the task bar by icon 350. The application (i.e., client application, desktop application, etc.) can be operable and/or compatible with a content management system. In FIG. 3B, the client application can display notification 352, which indicates to User B that User A has shared a link for accessing shared content ("Content Item J"). In some embodiments, in order to save display space, reduce distractions, etc., additional information about the shared link need not be displayed in notification 352. In some cases, User B can interact with (e.g., click on, hover over, etc.) notification 352 to cause window 354 to be displayed by the client application, as shown in FIG. 3C.

In addition to notification 352 of FIG. 3B, window 354 of FIG. 3C can further provide information about the shared link. Moreover, the client application can notify 356 User B that he already has access to the synchronized version of Content Item J. The synchronized version of Content Item J can be stored locally at User B's computing device and/or at User B's account with the content management system.

As shown in FIG. 3C, the client application can provide option 358 to access the synchronized version of Content Item J, option 360 to access the link share invitation, or option 362 to decline the link share invitation. In some cases, option 358 to access the synchronized version of Content Item J can correspond to navigating to a directory (e.g., local directory at the computing device, online directory at the content management system, etc.) where the synchronized version of Content Item J is stored. In some cases, option 360 for accessing the link share invitation can correspond to opening a web browsing application and navigating to a web location (e.g., web address, web page, etc.) where the link share invitation can be viewed or otherwise interacted with by User B. In some cases, option 362 to decline the link share invitation can correspond to ignoring the share invitation.

In some embodiments, the client application can be running while the computing device is in an active state (e.g., powered on, logged in, not in sleep-mode, not in hibernation-mode, etc.) and capable of communicating with the content management system (e.g., connect to a network such as the Internet). As such, notifications can be provided by the client application in real-time relative to (i.e., within an allowable time period from) when User A initiates the share invitation via the content management system.

Figure 4:
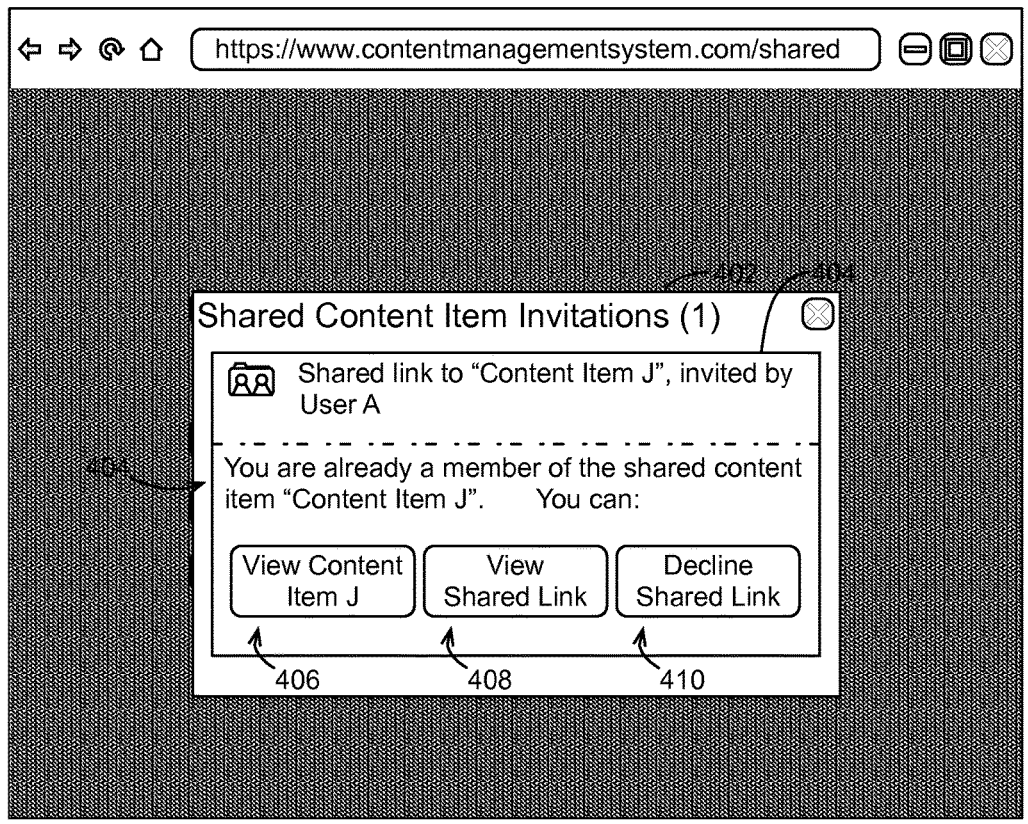
FIG. 4 shows an exemplary web interface for directing a user account to shared content.

FIG. 4 shows an exemplary web interface for directing a user account to shared content. In some embodiments, a user of an online content management system (e.g., 106 in FIG. 1) can utilize a browsing (or navigational) application, such as a web browser, to access the online content management system. In one example, User B can utilize the browsing application to access a web interface (e.g., website) for the online content management system. In this example, the web interface can display window 402 (within an allowable time period from) when User A makes a request to share a link with User B. The shared link can provide access to a non-synchronized (i.e., unsynchronized, read-only) version of Content Item J.

As previously discussed, in response to User A initiating the link share invitation to User B, the content management system can obtain information relating to the subject of the link share invitation, Content Item J. The information obtained relating to Content Item J can facilitate in identifying one or more member accounts of Content Item J (i.e., accounts that already have access to the shared, synchronized Content Item J). The content management system can thus determine that User B already has been granted access to the shared, synchronized Content Item J. Via the web interface, the content management system can notify 404 User B that he already has access to the shared, synchronized version of Content Item J.

As shown in FIG. 4, the web interface can also provide option 406 to access the synchronized version of Content Item J, option 408 to access the link share invitation, or option 410 to decline the link share invitation. In FIG. 4, option 406 for accessing the synchronized version of Content Item J can correspond, for example, to navigating to an online directory at User B's content management system account where the synchronized version of Content Item J is stored. Also, for example, option 408 to access the link share invitation can correspond to navigating to a web location where the link share invitation can be viewed or otherwise interacted with by User B. Moreover, option 410 to decline the link share invitation can, for example, correspond to ignoring the link share invitation.

Figure 5A:
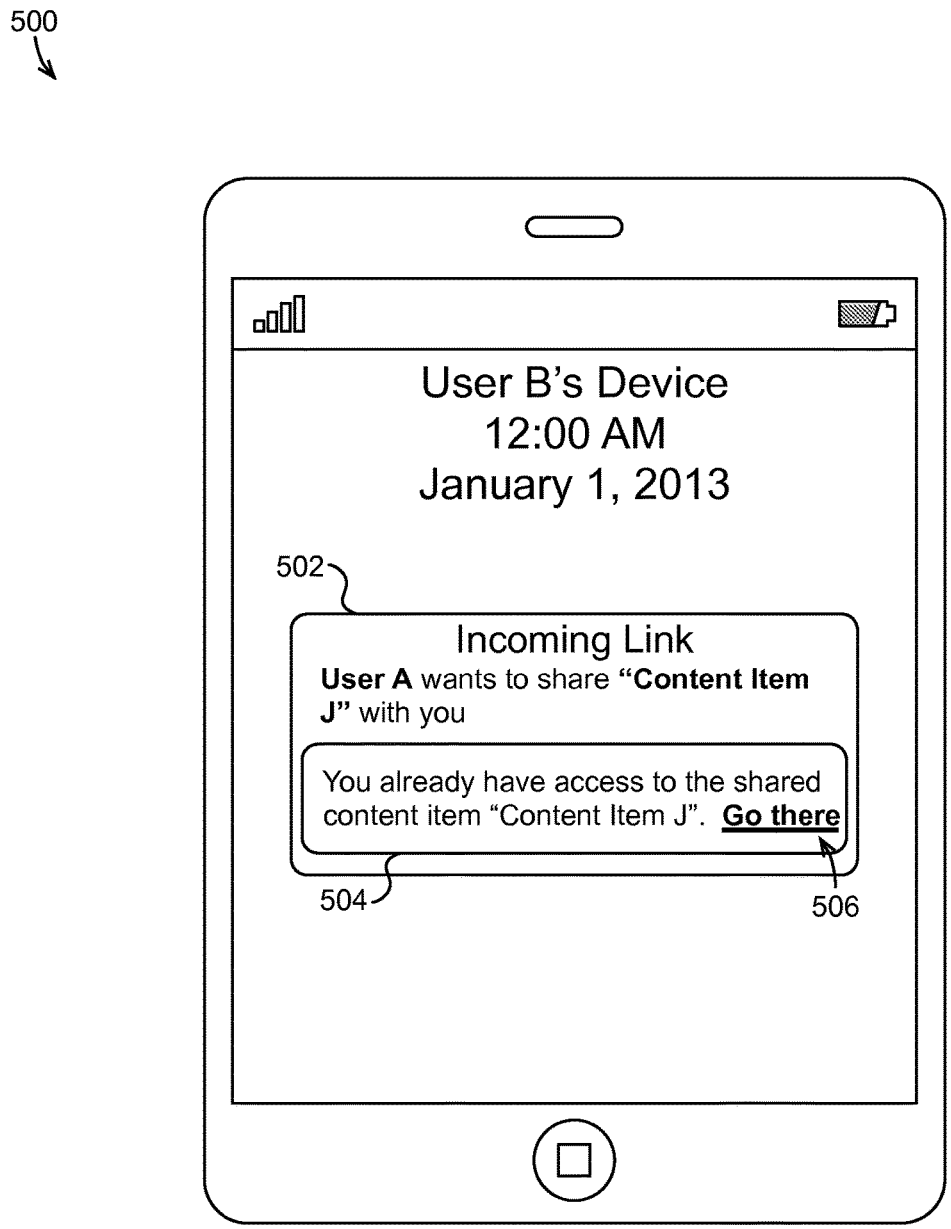
FIG. 5A shows an exemplary computing device embodiment used to direct a user account to shared content.

FIG. 5A shows an exemplary computing device embodiment used to direct a user account to shared content. In some embodiments, an application (i.e., app, mobile app, etc.) operable and/or compatible with a content management system (e.g., 106 in FIG. 1) can be implemented on a mobile computing device (e.g., smartphone, tablet, etc.) of a recipient user, such as User B, as shown in FIG. 5A. In the example of FIG. 5A, exemplary computing device embodiment 500 can have installed the app operable, compatible, and/or configured to work with the content management system. In some embodiments, exemplary computing device 500 can provide notification 502 to indicate to User B that User A has shared a link to a content item ("Content Item J") with User B. The shared link can provide access to a non-synchronized version (i.e., unsynchronized, read-only) of Content Item J. In some instances, exemplary computing device 500 can have implemented push notifications, such that notification 502 can be provided in substantially real-time.

In some embodiments, notification 502 can provide information 504 about the shared link. Information 504 can indicate to User B that he already is a member of the share content item (i.e., that he already has access to the synchronized version of Content Item J). Moreover, information 504 can provide option 506 for User B to access the synchronized version of Content Item J. In some cases, selecting option 506 can trigger a web browsing application to navigate to an online directory of User B's account at the content management system where the synchronized version of Content Item J is stored. In some cases, if the synchronized version of Content Item J is stored locally at the device, then selecting option 506 can trigger a file browsing application to navigate to the local directory on the device where the synchronized Content Item J is stored.

Figures 5B, 5C:
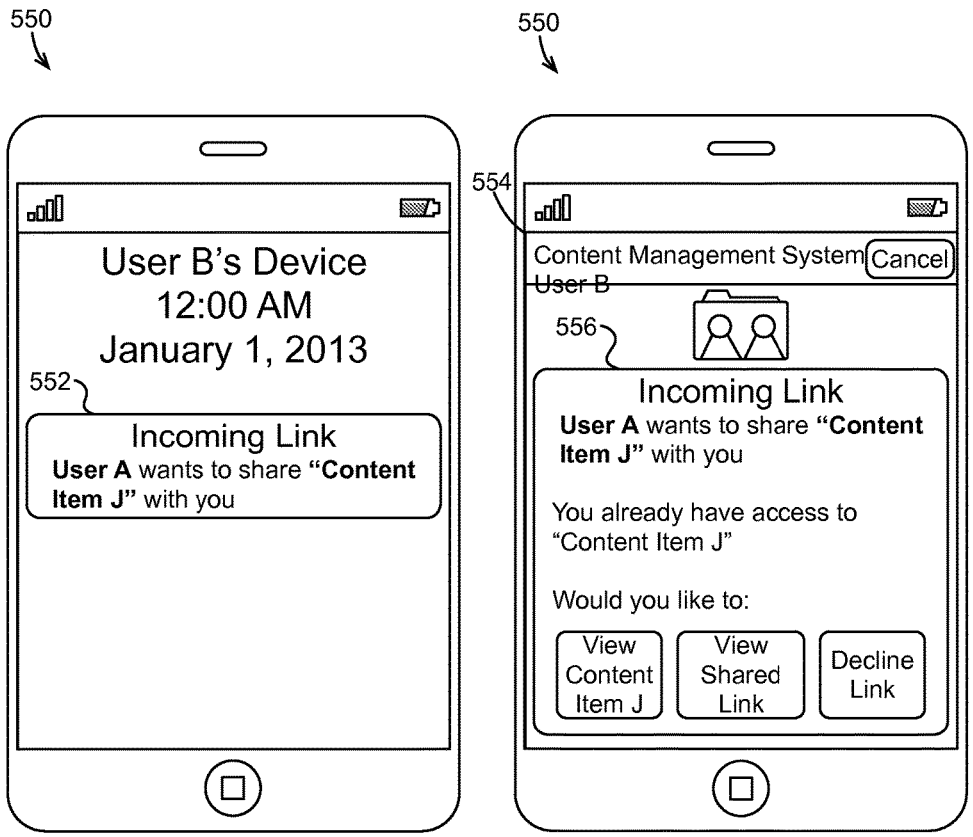
FIG. 5B shows an exemplary computing device embodiment used to direct a user account to shared content.
FIG. 5C shows an exemplary computing device embodiment used to direct a user account to shared content.

Referring now to FIG. 5B and FIG. 5C, there can be an exemplary computing device embodiment used to direct a user account to shared content. Exemplary computing device embodiment 550 in FIG. 5B and FIG. 5C can be associated with User B and can implement an app configured to work with the content management system. In response to User A initiating a link share invitation for Content Item J to User B, the app installed on device 550 can provide notification 552, specifying that User A has made the link share invitation to User B. The link share invitation can provide access to a non-synchronized version of Content Item J. For example, User B can trigger (e.g., click on, tap on, hover over, etc.) the link to enable downloading of the non-synchronized version of Content Item J.

Similar to previous discussions, in some embodiments, information about the shared link for Content Item J need not be presented with notification 552. Instead, User B can interact with notification 552 to cause the app to display interface 554 of FIG. 5C. Interface 554 can correspond to a graphical user interface (GUI) for the app. Interface 554 can provide information 556, which can include an indication that User B already has access to the synchronized version of Content Item J. Moreover, interface 544 can provide an option to access the synchronized version as well as options to access or decline the link share invitation.

Figure 6:
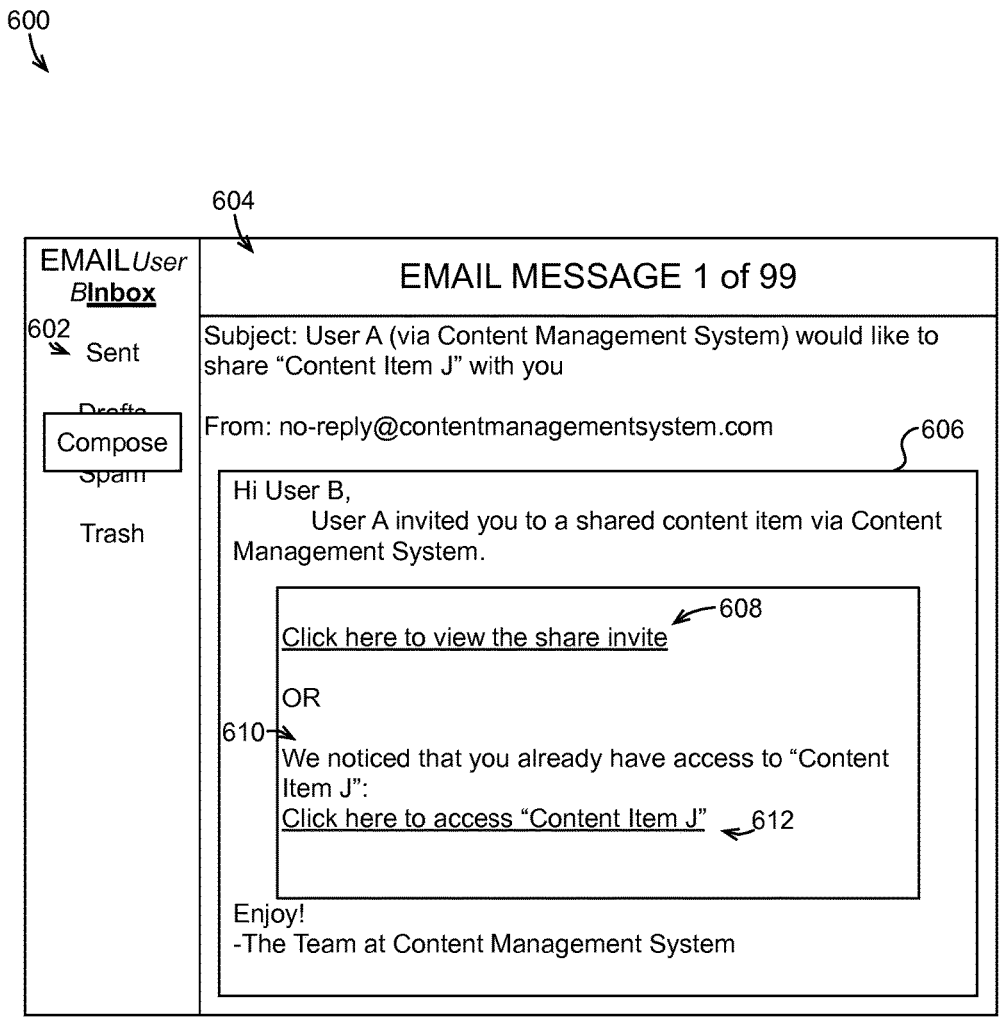
FIG. 6 shows an exemplary communication interface at which a user account can be directed to shared content.

Turning now to FIG. 6, FIG. 6 shows an exemplary communication interface at which a user account can be directed to shared content. Exemplary interface 600 can include an interface for an electronic mailing (i.e., email) system. In the example of FIG. 6, User B 602 can sign into User B's account with the email system. The email system can allow User B 602 to send and/or receive email messages.

In one example, User A of an online content management system (e.g., content management system 106 in FIG. 1) can send a link share invitation for Content Item J to User B 602 via the online content management system. In other words, User A can make a request to the online content management system to share with User B 602 a link to a non-synchronized (i.e., unsynchronized, read-only) version of Content Item J. The online content management system can receive User A's request and cause an email message to be sent to an email account associated with User B's content management system account. As shown in the example of FIG. 6, email message 604 can be sent by the content management system and received by User B's email account. In the example, email message 604 can include message content 606.

Continuing with the example of FIG. 6, email message content 606 can include shared link 608, in case User B indeed wants to access (e.g., download) the non-synchronized version of Content Item J. Additionally, email message content 606 can also include message 610 notifying User B 602 that he already has access to a shared and synchronized version of Content Item J. Further, option 612 can be provided to enable User B to access the shared and synchronized version of Content Item J.

Figure 7:
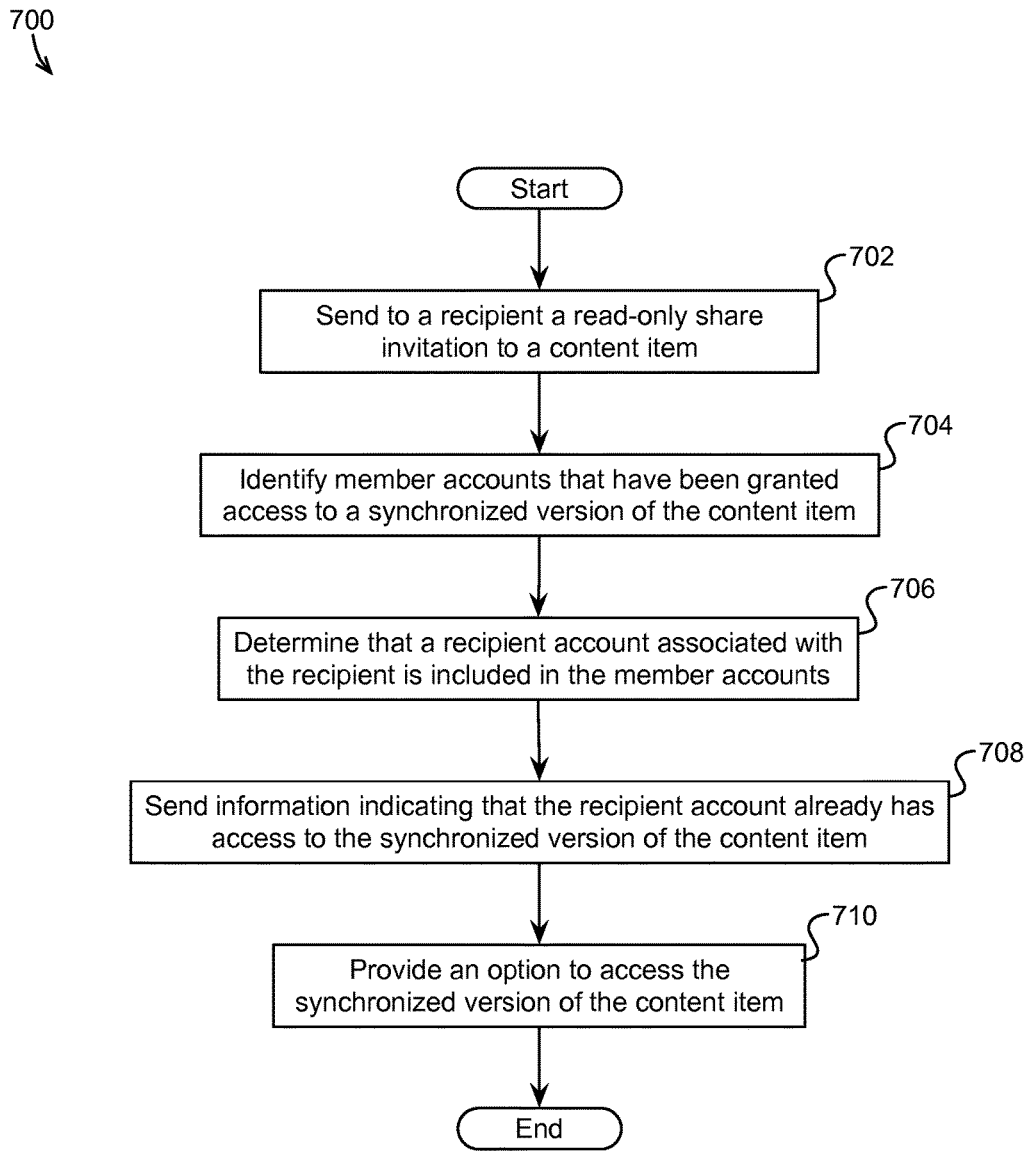
FIG. 7 shows an exemplary method embodiment for directing a user account to shared content.

FIG. 7 shows an exemplary method embodiment for directing a user account to shared content. It should be understood that there can be additional, fewer, or alternative steps performed in similar or alternative orders, or in parallel, within the scope of the various embodiments unless otherwise stated. Exemplary method embodiment 700 can send a share invitation to an unsynchronized version of a content item, at step 702. The share invitation can be sent to a recipient account associated with a content management system. In some cases, the content item can be associated with a sharer account of the content management system.

Step 704 can include identifying one or more member accounts that have been granted access to a synchronized version of the content item. In some embodiments, the one or more member accounts' access can be granted by the sharer account. Also, the synchronized version can provide the one or more member accounts with read and write access to the content item. Continuing with exemplary method embodiment 700, step 706 can involve determining that the recipient account is included in the one or more member accounts. Then exemplary method embodiment 700 can send, to the recipient account, information indicating that the recipient account already has access to the synchronized version of the content item, at step 708. Then at step 710, exemplary method 700 can provide an option to access the synchronized version of the content item.

Figure 8:
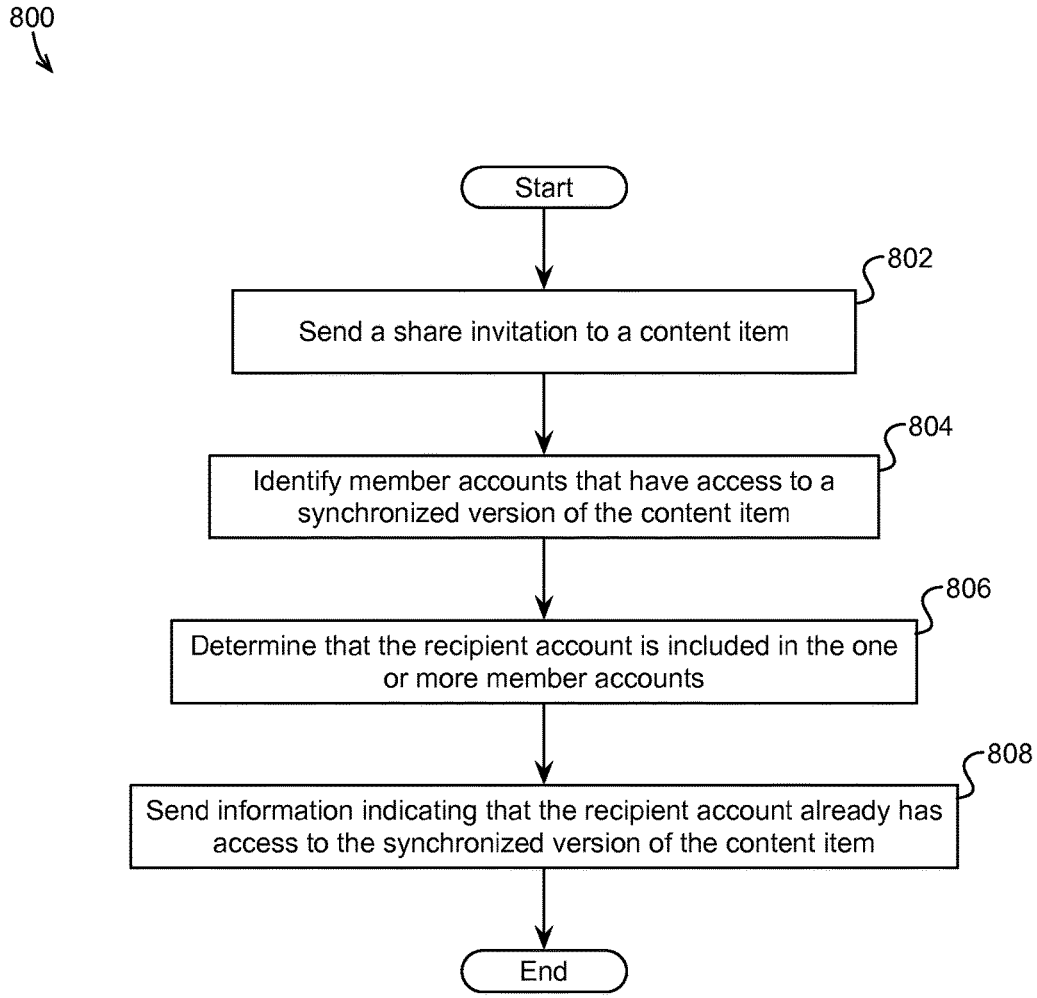
FIG. 8 shows an exemplary method embodiment for directing a user account to shared content.

FIG. 8 shows an exemplary method embodiment for directing a user account to shared content. As previously mentioned, it should be understood that there can be additional, fewer, or alternative steps performed in similar or alternative orders, or in parallel, within the scope of the various embodiments unless otherwise stated. Exemplary method embodiment 800 can send, to a recipient account associated with a content management system, a share invitation to a content item, at step 802. Step 804 can include identifying one or more member accounts that have access to a synchronized version of the content item.

Continuing with exemplary method 800, it can be determined that the recipient account is included in the one or more member accounts, at step 806. Then at step 808, method 800 can send, to the recipient account, information indicating that the recipient account already has access to the synchronized version of the content item.

Figure 9:
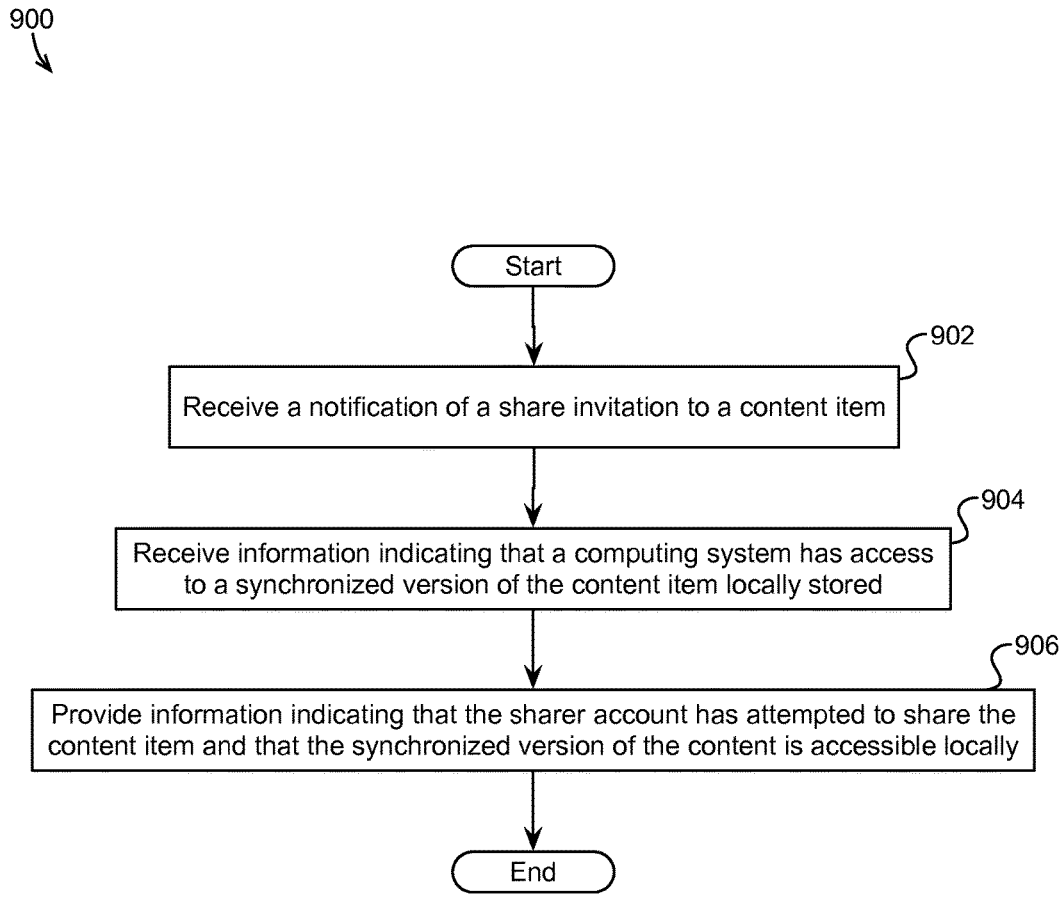
FIG. 9 shows an exemplary method embodiment for directing a user account to shared content.

FIG. 9 shows an exemplary method embodiment for directing a user account to shared content. Again, it should be understood that there can be additional, fewer, or alternative steps performed in similar or alternative orders, or in parallel, within the scope of the various embodiments unless otherwise stated. At step 902, exemplary method embodiment 900 can receive a notification of a share invitation to a content item. In some embodiments, the share invitation can provide access to an unsynchronized version of the content item and can be shared from a sharer account via a content management system.

Step 904 can include receiving information indicating that a computing system has access to a synchronized version of the content item locally stored. Then method 900 can provide information indicating that the sharer account has attempted to share the content item, at step 906. Moreover, in some case, the information can indicate that the synchronized version of the content item is accessible locally at the computing system.

As discussed above, the present technology can provide access to the synchronized version of the content item. In some embodiments, when the option is selected, there can be a navigation to a location where the synchronized version of the content item is stored. Moreover, in some cases, an appearance of the synchronized version of the content item at the location can be emphasized (e.g., highlighted).

In some embodiments, various embodiments can also prompt a recipient account to provide identification data (e.g., account credentials, username, passcode, etc.) for logging into the content management system. In some instances, prompting the recipient account can be performed prior to determining that the recipient account is included in the one or more member accounts.

Furthermore, in some embodiments, the sharer account that initiated the share invitation can receive a notification indicating that the recipient account already has access to the synchronized version of the content item.

Figure 10A:
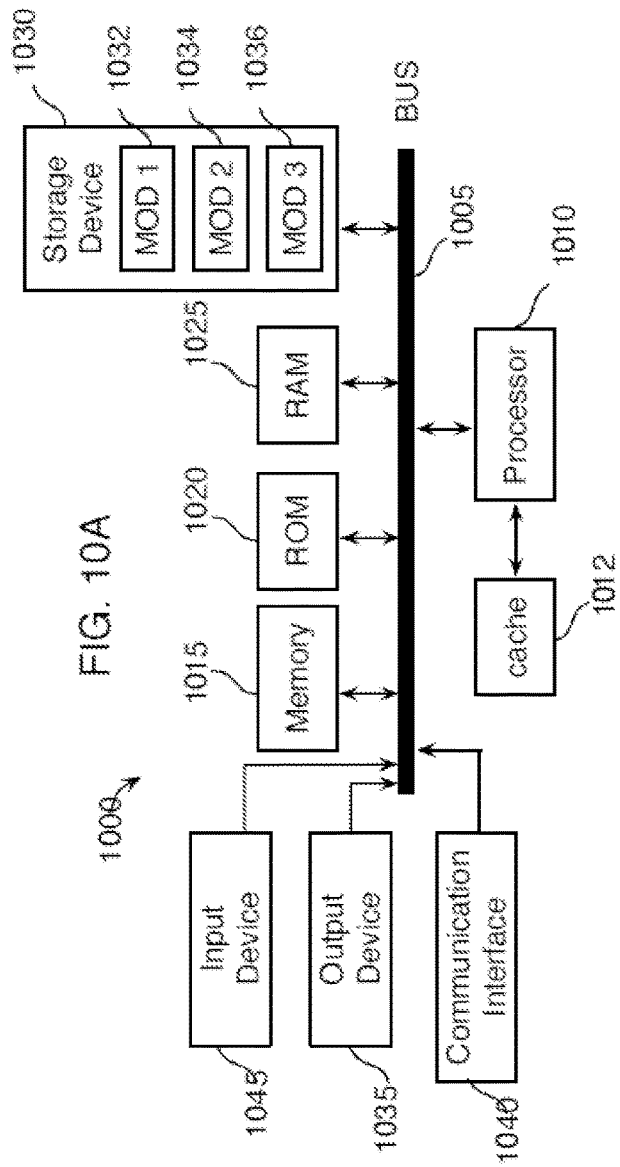
FIG. 10A shows an exemplary possible system embodiment for implementing various embodiments of the present technology.
Figure 10B:
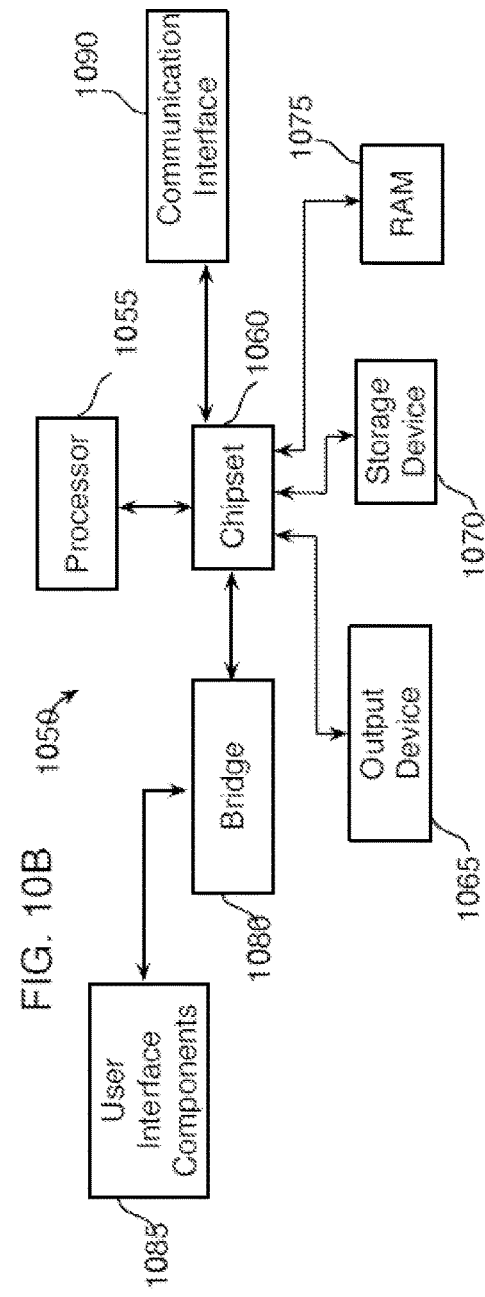
FIG. 10B shows an exemplary possible system embodiment for implementing various embodiments of the present technology.

With reference now to FIG. 10A and FIG. 10B, FIG. 10A and FIG. 10B show exemplary possible system embodiments. The more appropriate embodiment will be apparent to those of ordinary skill in the art when practicing the present technology. Persons of ordinary skill in the art will also readily appreciate that other system embodiments are possible.

FIG. 10A illustrates a conventional system bus computing system architecture 1000 wherein the components of the system are in electrical communication with each other using a bus 1005. Exemplary system 1000 includes a processing unit (CPU or processor) 1010 and a system bus 1005 that couples various system components including the system memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include software modules 1032, 1034, 1036 for controlling the processor 1010. Other hardware or software modules are contemplated. The storage device 1030 can be connected to the system bus 1005. In one aspect, a hardware module that performs a particular function can include the software component stored in a computer-readable medium in connection with the necessary hardware components, such as the processor 1010, bus 1005, display 1035, and so forth, to carry out the function.

FIG. 10B illustrates a computer system 1050 having a chipset architecture that can be used in executing the described method and generating and displaying a graphical user interface (GUI). Computer system 1050 is an example of computer hardware, software, and firmware that can be used to implement the disclosed technology. System 1050 can include a processor 1055, representative of any number of physically and/or logically distinct resources capable of executing software, firmware, and hardware configured to perform identified computations. Processor 1055 can communicate with a chipset 1060 that can control input to and output from processor 1055. In this example, chipset 1060 outputs information to output 1065, such as a display, and can read and write information to storage device 1070, which can include magnetic media, and solid state media, for example. Chipset 1060 can also read data from and write data to RAM 1075. A bridge 1080 for interfacing with a variety of user interface components 1085 can be provided for interfacing with chipset 1060. Such user interface components 1085 can include a keyboard, a microphone, touch detection and processing circuitry, a pointing device, such as a mouse, and so on. In general, inputs to system 1050 can come from any of a variety of sources, machine generated and/or human generated.

Chipset 1060 can also interface with one or more communication interfaces 1090 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1055 analyzing data stored in storage 1070 or 1075. Further, the machine can receive inputs from a user via user interface components 1085 and execute appropriate functions, such as browsing functions by interpreting these inputs using processor 1055.

It can be appreciated that exemplary systems 1000 and 1050 can have more than one processor 1010 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A content management system comprising:
one or more processors;
at least one computer-readable storage media having stored therein computer-readable instructions which, when executed by the one or more processors, cause the content management system to:
receive, from a sharer account registered with the content management system, a request to send a first link providing access to a content item in the content management system to a computing device associated with a recipient account;
identify one or more member accounts that have been granted, prior to sending the first link, access, by the sharer account, to a synchronized version of the content item;
determine that the recipient account is one of the one or more member accounts;
replace the first link providing access to the content item in the content management system with a second link for opening the synchronized version of the content item locally from the computing device associated with the recipient account; and
send, to the computing device associated with the recipient account, the second link for opening the synchronized version of the content item locally from the computing device associated with the recipient account.

2. The content management system of claim 1, wherein the second link, when activated by the computing device, is configured to cause the computing device to navigate to a local directory on the computing device where the synchronized version of the content item is stored and opening the synchronized version of the content item from the local directory.

3. The content management system of claim 2, wherein the second link comprises a button providing one or more options for opening the synchronized version of the content item.

4. The content management system of claim 3, wherein the one or more options comprise a first option to open the synchronized version of the content item via a first application or a second option to open the synchronized version of the content item via a second application.

5. The content management system of claim 1, wherein determining that the recipient account is included in the one or more member accounts further comprises:
- obtaining a first set identification data for the recipient account;
- comparing the recipient account to the one or more member accounts using, at least in part, the first set identification data for the recipient account; and
- determining that the first set identification data for the recipient account matches, within an allowable deviation, a second set identification data for at least one of the one or more member accounts.

6. The content management system of claim 5, wherein the first set identification data for the recipient account corresponds to namespace data for the recipient account, and wherein the second set identification data for the at least one of one or more member accounts corresponds to namespace data for the at least one of one or more member accounts.

7. The content management system of claim 1, wherein identifying the one or more member accounts that have access to the synchronized version of the content item further comprises:
- obtaining first identification data for the content item;
- obtaining a list of member accounts that are allowed to access the synchronized version of content item, the list of member accounts being obtained using, at least in part, the first identification data for the content item; and
- obtaining second identification data for the one or more member accounts based, at least in part, on the list of member accounts.

8. The content management system of claim 1, wherein the at least one computer-readable storage medium stores additional computer-readable instructions which, when executed by the one or more processors, cause the system to:
- prior to determining that the recipient account is included in the one or more member accounts, prompt the recipient account to provide identification data for logging into the content management system.

9. A computer-implemented method comprising:
- receiving, from a sharer account registered with a content management system, a request to send a first link providing access to a content item in the content management system to a computing device associated with a recipient account;
- identifying one or more member accounts that have been granted, prior to sending the first link, access, by the sharer account, to a synchronized version of the content item;
- determining that the recipient account is one of the one or more member accounts;
- replacing the first link providing access to the content item in the content management system with a second link for opening the synchronized version of the content item locally from the computing device associated with the recipient account; and
- sending, to the computing device associated with the recipient account, the second link for opening the synchronized version of the content item locally from the computing device associated with the recipient account.

10. The computer-implemented method of claim 9, wherein the second link, when activated by the computing device, is configured to cause the computing device to navigate to a local directory on the computing device where the synchronized version of the content item is stored and opening the synchronized version of the content item from the local directory.

11. The computer-implemented method of claim 9, wherein sending the second link comprises sending a notification comprising the second link and a selectable option for sharing at least one of the content item or the synchronized content item with a different recipient account.

12. The computer-implemented method of claim 9, wherein a selection of the second link triggers a local application to navigate to a local directory and open the synchronized version of the content item from the local directory.

13. The computer-implemented method of claim 12, wherein the local application comprises a web browser application and the selection is via a web interface associated with the web browser application.

14. The computer-implemented method of claim 12, wherein the local application comprises an electronic mail application and sending the second link comprises sending an electronic mail message comprising the second link.

15. The computer-implemented method of claim 9, further comprising:
- prompting, prior to determining that the recipient account is included in the one or more member accounts, the recipient account to provide identification data for logging into the content management system.

16. The computer-implemented method of claim 9, further comprising:
- providing a notification to the sharer account that initiated the request indicating that the recipient account already has access to the synchronized version of the content item.

17. The computer-implemented method of claim 9, further comprising:
- detecting a modification to the synchronized version of the content item, the modification being made by the recipient account; and
- causing the modification to the synchronized version of the content item to be applied to the content item at the content management system and a respective synchronized version of the content item associated with the one or more member accounts.

18. A non-transitory computer-readable storage medium comprising:
- instructions stored thereon which, when executed by one or more processors, cause the one or more processors to:
  - receive, from a sharer account registered with a content management system, a request to send a first link providing access to a content item in the content management system to a computing device associated with a recipient account;
  - identify one or more member accounts that have been granted, prior to sending the first link, access, by the sharer account, to a synchronized version of the content item;
  - determine that the recipient account is one of the one or more member accounts;
  - replace the first link providing access to the content item in the content management system with a second link for opening the synchronized version of the content item locally from the computing device associated with the recipient account; and
  - send, to the computing device associated with the recipient account, the second link for opening the synchronized version of the content item locally from the computing device associated with the recipient account.

19. The non-transitory computer-readable medium of claim 18, storing additional instructions which, when executed by one or more processors, cause the one or more processors to:
   detect a modification to the synchronized version of the content item, the modification being made by the recipient account; and
   cause the modification to the synchronized version of the content item to be applied to the content item at the content management system and a respective synchronized version of the content item associated with the one or more member accounts.

20. The non-transitory computer-readable medium of claim 19, wherein the second link, when activated by the computing device, is configured to cause the computing device to navigate to a local directory on the computing device where the synchronized version of the content item is stored and opening the synchronized version of the content item from the local directory.

\* \* \* \* \*